H. L. HENDERSON.
BEARING ALARM.
APPLICATION FILED OCT. 18, 1921.
1,427,593.
Patented Aug. 29, 1922.
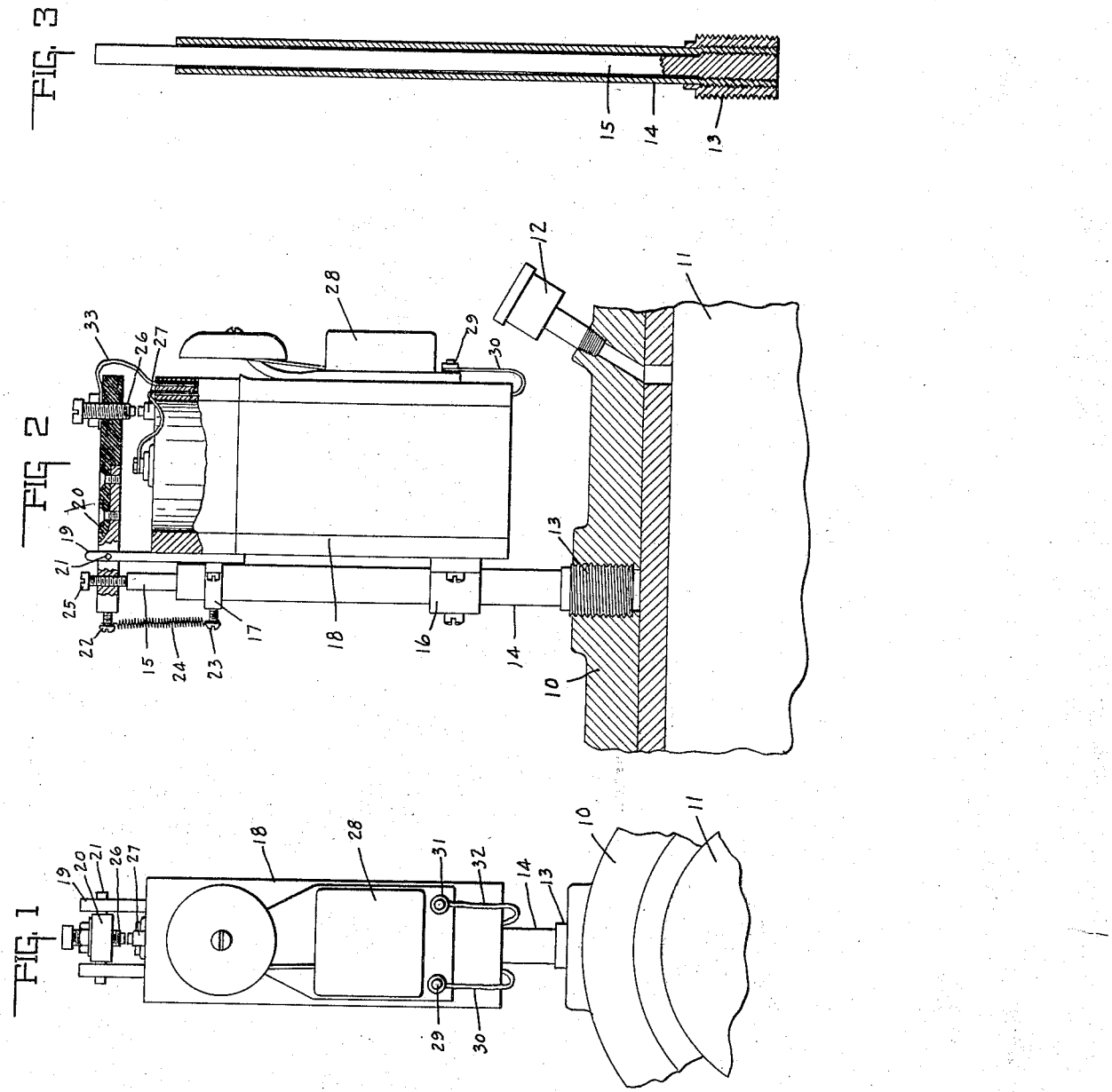
INVENTOR.
HOWARD L. HENDERSON.
BY
ATTORNEYS.

UNITED STATES PATENT OFFICE.

HOWARD L. HENDERSON, OF TERRE HAUTE, INDIANA.

BEARING ALARM.

1,427,593.   Specification of Letters Patent.   Patented Aug. 29, 1922.

Application filed October 18, 1921. Serial No. 508,539.

*To all whom it may concern:*

Be it known that I, HOWARD L. HENDERSON, a citizen of the United States, and a resident of Terre Haute, county of Vigo and State of Indiana, have invented a certain new and useful Bearing Alarm; and I do hereby declare that the following is a full, clear, and exact description thereof, reference being had to the accompanying drawings, in which like numerals refer to like parts.

This invention relates to an automatic alarm for bearings and the like to indicate the over-heating thereof through lack of lubrication or other causes that may be remedied.

It often happens that in large stationary engines, motors and moving parts the bearings become over-heated, probably through lack of proper lubrication, which will soon burn them out and cause the shutting down of the machinery and, therefore, a great loss of time and money in production besides the cost of renewing the bearings. In order to guard against such a contingency I have provided an alarm which is small and compact and may be mounted directly upon the bearing. The nature of the device is such that upon the over-heating of the bearing the heat therefrom causes the expansion of a metallic bar, which expansion will cause the closing of a circuit which will result in the ringing of an alarm bell.

The full nature of this invention will be understood from the accompanying drawings and the following description and claim.

In the drawings Fig. 1 is a front elevation of the alarm mounted upon a bearing. Fig. 2 is a side elevation thereof. Fig. 3 is a section taken on the line 3—3 of Fig. 2.

In the drawings there is shown a bearing 10 for the shaft 11, said bearing being lubricated by the oil cup 12 in the usual manner. The bearing is tapped to receive the brass bushing 13 which is provided with internal screw threads for receiving an iron pipe 14 which extends vertically upward therefrom. The lower end of the iron pipe 14 is internally threaded to receive a copper bar 15 which extends upwardly through said pipe, as shown in Fig. 3. Rigidly mounted on said pipe there are supporting brackets 16 and 17 to which is rigidly secured a battery box 18 arranged to contain a plurality of dry cells 18ª.

Secured between the brackets 16 and the battery box 18 there is an upright support 19 to which is pivoted a contact arm 20 by the pin 21. The rear end of said contact arm is provided with a screw 22 which is connected with the set screw 23 in the bracket 17 by a coil spring 24. Extending vertically through the rear portion of the lever 20 there is an adjusting screw 25 arranged to screw therethrough to close proximity with the upper end of the expansion bar 15, said bar having its lower end in close proximity with the surface of the bearing and extending upwardly through the pipe 14 to a point near the lever 20. The lever 20 is formed or partially formed of non-conducting material so as not to transmit any current to the expansion bar 15, the battery box or supporting members.

On the outer end of the lever 20 there is provided a contact screw 26 extending downwardly therefrom and positioned to engage and make contact with the contact point 27 when the lever is tilted. Mounted on the battery box there is the usual electric bell 28 which has the terminal 29 directly connected through the wire 30 with one of the battery terminals, and the terminal 31 connected by the wire 32 with the contact point 27. The contact screw 26 is electrically connected through the wire 33 with the opposite terminal of the battery so that, when contact is made between the screw 26 and the point 27, the circuit is closed and the current passing therethrough will cause the ringing of the bell.

In operation, the heat from the over-heated bearing will be conducted to the copper expansion bar 15 causing the same to expand and engage the set screw 25 at its upper end, forcing the rear end of the lever 20 upwardly against the tension of the spring 24 and the other end thereof downwardly causing the contact screw 26 to engage and make electrical contact with the point 27. This will cause the circuit to be closed and the alarm bell to ring until the heat of the bearing decreases to normal. Upon the heat of said bearing decreasing, the bar 15 will contact so as to permit the spring 24 to draw the rear end of the lever downwardly and the other end upwardly, breaking the contact between the screw 26 and the point 27. Whereas there is shown herein a form of alarm which is a complete unit for a single bearing, it is quite evident that the battery box and bell may be placed at a distance and connected with the contact screw 26 and point 27, wherein the operation will be the same as above described. Also if desired, the single battery box and bell may be used for all bearings in the same manner.

The invention claimed is:

The combination with a bearing having a rotatable shaft therein, of means for indicating the over-heating thereof comprising a self contained unit and including a tubular supporting member mounted in said bearing, an expansion bar mounted in said member and extending outwardly therethrough, a battery box mounted upon said supporting member having an electric battery therein, a circuit including said battery, an electric bell mounted on said box, and a circuit closer comprising a lever pivoted intermediate its ends on mounting means supported by said member and having a contact post on the end thereof, yielding means on the opposite end for normally maintaining said contact post in circuit breaking position, and adjustable means on said lever in position to be engaged by said bar for tilting said lever about its pivot point and causing said post to make contact and complete said circuit whereby the alarm will be sounded upon the expansion of said bar.

In witness whereof I have hereunto affixed my signature.

HOWARD L. HENDERSON.